(12) United States Patent
Petrov et al.

(10) Patent No.: US 8,914,279 B1
(45) Date of Patent: Dec. 16, 2014

(54) EFFICIENT PARSING WITH STRUCTURED PREDICTION CASCADES

(71) Applicant: Google Inc., Mountain View, CA (US)

(72) Inventors: Slav Petrov, New York, NY (US); Alexander Rush, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 152 days.

(21) Appl. No.: 13/624,280

(22) Filed: Sep. 21, 2012

Related U.S. Application Data (60) Provisional application No. 61/538,539, filed on Sep. 23, 2011.

(51) Int. Cl.
*G06F 17/27* (2006.01)
*G06F 17/20* (2006.01)
*G06F 17/21* (2006.01)

(52) U.S. Cl.
USPC ..................................... 704/9; 704/1; 704/10

(58) Field of Classification Search
USPC ................................................... 704/1, 9, 10
See application file for complete search history.

(56) References Cited

U.S. PATENT DOCUMENTS

| | | | |
|---|---|---|---|
| 6,606,594 B1 * | 8/2003 | Sejnoha et al. | 704/250 |
| 6,901,399 B1 * | 5/2005 | Corston et al. | 1/1 |
| 7,277,850 B1 * | 10/2007 | Hakkani-Tur et al. | 704/232 |
| 2002/0046018 A1 * | 4/2002 | Marcu et al. | 704/9 |
| 2007/0005341 A1 * | 1/2007 | Burges et al. | 704/9 |
| 2010/0076761 A1 * | 3/2010 | Juergen et al. | 704/235 |

OTHER PUBLICATIONS

Bergsma et al. "Fast and Accurate Arc Filtering for Dependency Parsing". Proceedings of the 23rd International Conference on Computational Linguistics, Beijing, Aug. 2010.*
Bergsma, S. et al., "Fast and Accurate Arc Filtering for Dependency Parsing," In Proceedings of the 23rd International Conference on Computational Linguistics (Coling 2010), Beijing, pp. 53-61, Aug. 2010.
Buchholz, S. et al., "CoNLL-X shared task on Multilingual Dependency Parsing," Proceedings of the 10th Conference on Computational Natural Language Learning (CoNLL-X), pp. 149-164, New York City, Jun. 2006.
Carreras, X. et al., "TAG, Dynamic Programming, and the Perceptron for Efficient, Feature-rich Parsing," CoNLL 2008: Proceedings of the 12th Conference on Computational Natural Language Learning, pp. 9-16, Manchester, Aug. 2008.

(Continued)

*Primary Examiner* — Jesse Pullias
(74) *Attorney, Agent, or Firm* — Remarck Law Group PLC (57) ABSTRACT

A dependency parsing method can include determining an index set of possible head-modifier dependencies for a sentence. The index set can include inner arcs and outer arcs, inners arcs representing possible dependency between words in the sentence separated by a distance less than or equal to a threshold and outer arcs representing possible dependency between words in the sentence separated by a distance greater than the threshold. The index set can be pruned to include: (i) each specific inner arc when a likelihood that the specific inner arc is appropriate is greater than a first threshold, and (ii) the outer arcs when a likelihood that there exists any possible outer arc that is appropriate is greater than the first threshold. The method can include further pruning the pruned index set based on a second parsing algorithm, and determining a most-likely parse for the sentence from the pruned index set.

20 Claims, 6 Drawing Sheets

(56) References Cited

OTHER PUBLICATIONS

Carreras, X., "Experiments with a Higher-Order Projective Dependency Parser," Proceedings of the CoNLL Shared Task Session of EMNLP-CoNLL 2007, vol. 7, pp. 957-961, Prague, Jun. 2007.

Charniak, M. et al., "Multilevel Coarse-to-fine PCFG Parsing," Proceedings of the Human Language Technology Conference of the North American Chapter of the ACL, pp. 168-175, New York, Jun. 2006.

Collins, M., "Discriminative Training Methods for Hidden Markov Models: Theory and Experiments with Perceptron Algorithms," Proceedings of the Conference on Empirical Methods in Natural Language Processing (EMNLP), Association for Computational Linguistics, Philadelphia, Jul. 2002, pp. 1-8.

Crammer, K. et al., "Online Passive-Aggressive Algorithms," Journal of Machine Learning Research, 7: 551-585 (2006).

Crammer, K. et al., "Ultraconservative Online Algorithms for Multiclass Problems," Journal of Machine Learning Research 3: 951-991, 2003.

Eisner, J. et al., "Parsing with Soft and Hard Constraints on Dependency Length," Proceedings of the Ninth International Workshop on Parsing Technologies (IWPT), pp. 30-41, Vancouver, Oct. 2005.

Eisner, J., "Bilexical Grammars and Their Cubic-Time Parsing Algorithms," In Harry C. Bunt and Anton Nijholt (eds.), Advances in Probabilistic and Other Parsing Technologies, Chapter 3, pp. 29-62, 2000 Kluwer Academic Publishers.

Huang, L. et al., "Dynamic Programming for Linear-Time Incremental Parsing," Proceedings of the 48th Annual Meeting of the Association for Computational Linguistics, pp. 1077-1086, Uppsala, Sweden, Jul. 11-16, 2010.

Klein, D. et al., "Parsing and Hypergraphs," Computer Science Department, Stanford University, Stanford, CA, 12 pages, 2004.

Koo, T. et al., "Dual Decomposition for Parsing with Non-Projective Head Automata," Proceedings of the 2010 Conference on Empirical Methods in Natural Language Processing, pp. 1288-1298, MIT, Massachusetts, USA, Oct. 9-11, 2010.

Koo, T. et al., "Efficient Third-order Dependency Parsers," Proceedings of the 48th Annual Meeting of the Association for Computational Linguistics, pp. 1-11, Uppsala, Sweden, Jul. 11-16, 2010.

Kuhlmann, M. et al., "Dynamic Programming Algorithms for Transition-Based Dependency Parsers," Proceedings of the 49th Annual Meeting of the Association for Computational Linguistics, pp. 673-682, Portland, Oregon, Jun. 19-24, 2011.

Lafferty, J. et al., "Conditional Random Fields: Probabilistic Models for Segmenting and Labeling Sequence Data," in Proceedings of the 18th International Conference on Machine Learning 2001 (ICML 2001), pp. 282-289.

McDonald, R. et al., "Online Large-Margin Training of Dependency Parsers," Proceedings of the 43rd Annual Meeting of the ACL, pp. 91-98, Ann Arbor, Jun. 2005.

McDonald, R. et al., "Online Learning of Approximate Dependency Parsing Algorithms," In Proceedings of EACL, 2006, vol. 6, pp. 81-88.

Nivre, J. et al., "Memory-Based Dependency Parsing," In Proceedings of CoNLL, 2004, pp. 49-56.

Nocedal, J. et al., "Numerical Optimization," Springer Series in Operations Research, 1999, 651 pages.

Pauls, A. et al., "Hierarchical Search for Parsing," Human Language Technologies: The 2009 Annual Conference of the North American Chapter of the ACL, pp. 557-565, Boulder, Colorado, Jun. 2009.

Petrov, S. et al., "A Universal Part-of-Speech Tagset," in LREC, pp. 2089-2096 (2012).

Petrov, S. et al., "Improved Inference for Unlexicalized Parsing," Proceedings of NAACL HLT 2007, pp. 404-411, Rochester, NY, Apr. 2007.

Petrov, S., "Coarse-to-Fine Natural Language Processing," Ph.D. Thesis, University of California at Berkeley, Berkeley, CA, 2009, 144 pages.

Roark, B. et al., "Classifying chart cells for quadratic complexity context-free inference," Proceedings of the 22nd International Conference on Computational Linguistics (Coling 2008), pp. 745-752, Manchester, Aug. 2008.

Rush, A. et al., "Vine Pruning for Efficient Multi-Pass Dependency Parsing," 2012 Conference of the North American Chapter of the Association for Computational Linguistics: Human Language Technologies, pp. 498-507, Montreal, Canada, Jun. 3-8, 2012.

Shalev-Shwartz, S. et al.,"Pegasos: Primal Estimated sub-gradient solver for SVM," Proceedings of the 24th International Conference on Machine Learning, Corvallis, OR, 2007, pp. 807-814.

Taskar, B. et al., "Max-Margin Markov Networks," Advances in Neural Information Processing Systems, 16:25-32, 2003.

Tsochantaridis, I. et al., "Large Margin Methods for Structured and Interdependent Output Variables," Journal of Machine Learning Research 6 (2005) 1453-1484.

Weiss, D. et al., "Structured Prediction Cascades," Appearing in Proceedings of the 13th International Conference on Artificial Intelligence and Statistics (AISTATS) 2010, Chia Laguna Resort, Sardinia, Italy. vol. 6 of JMLR: W&CP 6. Copyright 2010, 8 pages.

Xu, P. et al., "Self-Supervised Discriminative Training of Statistical Language Models," 2009 IEEE Workshop on Automatic Speech Recognition&Understanding, pp. 317-322.

Yamada, H. et al., "Statistical Dependency Analysis With Support Vector Machines," In Proceedings of IWPT, vol. 3, pp. 195-206, 2003.

Zhang, Y. et al., "Transition-based Dependency Parsing with Rich Non-local Features," Proceedings of the 49th Annual Meeting of the Association for Computational Linguistics:shortpapers, pp. 188-193, Portland, Oregon, Jun. 19-24, 2011.

* cited by examiner

EFFICIENT PARSING WITH STRUCTURED PREDICTION CASCADES

CROSS-REFERENCE TO RELATED APPLICATIONS

This application claims the benefit of U.S. Provisional Application No. 61/538,539, filed on Sep. 23, 2011. The disclosure of the above application is incorporated herein by reference in its entirety.

FIELD

The present disclosure relates to a technique for dependency parsing of text.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Dependency parsers typically utilize a parsing algorithm to find a most-likely parse for a given text, e.g., a sentence. A most-likely parse will identify head-modifier pairs for each word in the text. Each word in the text will be identified as a "modifier" for a "head," which is a different word in the text (or a "null" token such as that identifying a beginning of a sentence). Each word in the text, however, does not necessarily operate as a "head" of another word. As the number of words in a text increases, the amount of time necessary to compute the most-likely parse may increase exponentially. For example only, a text having a length n can have a first-order index set of $n^2$ elements, where each index may be identified as (h, m) where h has a value of $\{0, \ldots n\}$, m has a value of $\{0, \ldots n\}$ and h≠m. In this example, if the parsing algorithm analyzes and scores each index individually, the number of operations may be so computationally expensive as to be prohibitive. Additionally, for higher-order dependency parsing, these problems are exacerbated as the number of computations is even larger. An efficient parsing technique that reduces the number of computations necessary while maintaining an acceptable level of accuracy would be desirable.

SUMMARY

In some embodiments of the present disclosure, a computer-implemented method for dependency parsing is disclosed. The method can include receiving, at a computing device having one or more processors, a sentence including one or more words. The method can further include determining, at the computing device, an index set of possible head-modifier dependencies for the sentence. The index set can include inner arcs and outer arcs, where the inners arcs represent possible head-modifier dependency between words in the sentence separated by a distance less than or equal to a first distance threshold and the outer arcs represent possible head-modifier dependency between words in the sentence separated by a distance greater than the first distance threshold. Additionally, the method can include pruning, at the computing device, the outer arcs to exclude arcs representing possible head-modifier dependency between words in the sentence separated by a distance greater than a second distance threshold to obtain a first pruned index set. The second distance threshold can be based on a determination of a longest head-modifier dependency distance observed in training data. The method can also include pruning, at the computing device, the first pruned index set based on an augmented vine parsing algorithm to obtain a second pruned index set. The second pruned index set can include: (i) each specific inner arc when a likelihood that the specific inner arc is appropriate is greater than a first threshold, and (ii) the outer arcs in the first pruned index set when a likelihood that there exists a possible outer arc that is appropriate is greater than the first threshold. Each specific inner arc can correspond to a specific index and the likelihood that the specific inner arc is appropriate can be determined based on a max-marginal value of its corresponding specific index. The method can further include (i) pruning, at the computing device, the second pruned index set based on a second parsing algorithm to obtain a third pruned index set, the second parsing algorithm being a first-order parsing model, (ii) pruning, at the computing device, the third pruned index set based on a third parsing algorithm to obtain a fourth pruned index set, the third parsing algorithm being a second-order parsing model, and (iii) pruning, at the computing device, the fourth pruned index set based on a fourth parsing algorithm to obtain a fifth pruned index set, the fourth parsing algorithm being a third-order parsing model. The method can additionally include determining, at the computing device, a most-likely parse for the sentence from the fifth pruned index set and outputting, from the computing device, the most-likely parse.

In various other embodiments, a second computer-implemented method for dependency parsing is disclosed. The method can include receiving, at a computing device, a sentence including one or more words. The method can further include determining, at the computing device, an index set of possible head-modifier dependencies for the sentence. The index set can include inner arcs and outer arcs, where the inners arcs represent possible head-modifier dependency between words in the sentence separated by a first distance less than or equal to a distance threshold and the outer arcs represent possible head-modifier dependency between words in the sentence separated by a second distance greater than the distance threshold. The method can also include pruning, at the computing device, the index set based on an augmented vine parsing algorithm to obtain a first pruned index set. The first pruned index set can include: (i) each specific inner arc when a likelihood that the specific inner arc is appropriate is greater than a first threshold, and (ii) the outer arcs when a likelihood that there exists any possible outer arc that is appropriate is greater than the first threshold. Additionally, the method can include pruning, at the computing device, the first pruned index set based on a second parsing algorithm to obtain a second pruned index set, determining, at the computing device, a most-likely parse for the sentence from the second pruned index set, and outputting, from the computing device, the most-likely parse.

In various embodiments, a computing device is disclosed. The computing device can include at least one processor and a non-transitory computer-readable storage medium storing executable computer program code. The at least one processor can be configured to execute the executable computer program code to perform operations. The operations can include receiving a sentence including one or more words. The operations can further include determining an index set of possible head-modifier dependencies for the sentence. The index set can include inner arcs and outer arcs, where the inners arcs represent possible head-modifier dependency between words in the sentence separated by a first distance less than or equal to a distance threshold and the outer arcs represent possible head-modifier dependency between words in the sentence separated by a second distance greater than the distance threshold. The operations can also include pruning the index set based on an augmented vine parsing algorithm to obtain a first pruned index set. The first pruned index set can include: (i) each specific inner arc when a likelihood that the specific inner arc is appropriate is greater than a first threshold, and (ii) the outer arcs when a likelihood that there exists any possible outer arc that is appropriate is greater than the first threshold. Additionally, the operations can include pruning the first pruned index set based on a second parsing algorithm to obtain a second pruned index set, determining a most-likely parse for the sentence from the second pruned index set, and outputting the most-likely parse.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
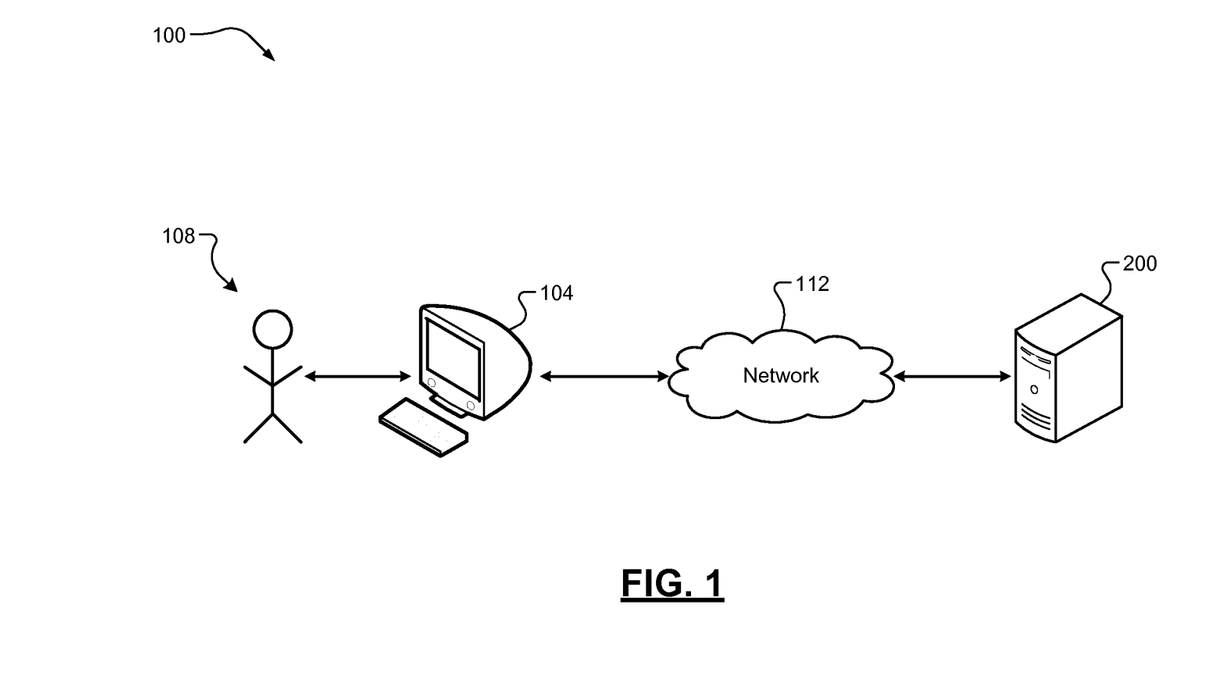
FIG. 1 is a functional block diagram of a computing network including an example computing device according to some implementations of the present disclosure.

Referring now to FIG. 1, a computing network 100 including an example computing device 104 according to some implementations of the present disclosure is illustrated. It should be appreciated that the term "computing device" as used herein can refer to any suitable computing device including one or more processors (a desktop computer, a laptop computer, a tablet computer, a mobile phone, a server, etc.). The computing device 104 can receive input from and/or provide output to a user 108. The computing device 104 can communicate with other computing devices via a network 112. The network 112 can include a local area network (LAN), a wide area network (WAN), e.g., the Internet, or a combination thereof.

In particular, the computing device 104 can communicate with another computing device 200 via the network 112. In some embodiments, the other computing device 200 may take the form of a server as illustrated. It should be appreciated that the term "server" as used herein can refer to either a single server or two or more servers operating in a parallel or distributed architecture. The computing device 200 can be configured to perform the dependency parsing techniques described below.

According to the techniques of the present disclosure, the user 108 can provide a user input at the computing device 104. The user input can be, for example, a portion of text (a sentence, a paragraph, a document, etc.) or an identification of a portion of text. The computing device 104 can transmit the user input to the other computing device 200 via the network 112. The computing device 104 can then receive a most-likely parse of the text from the other computing device 200 via the network 112, as described more fully below.

Figure 2:
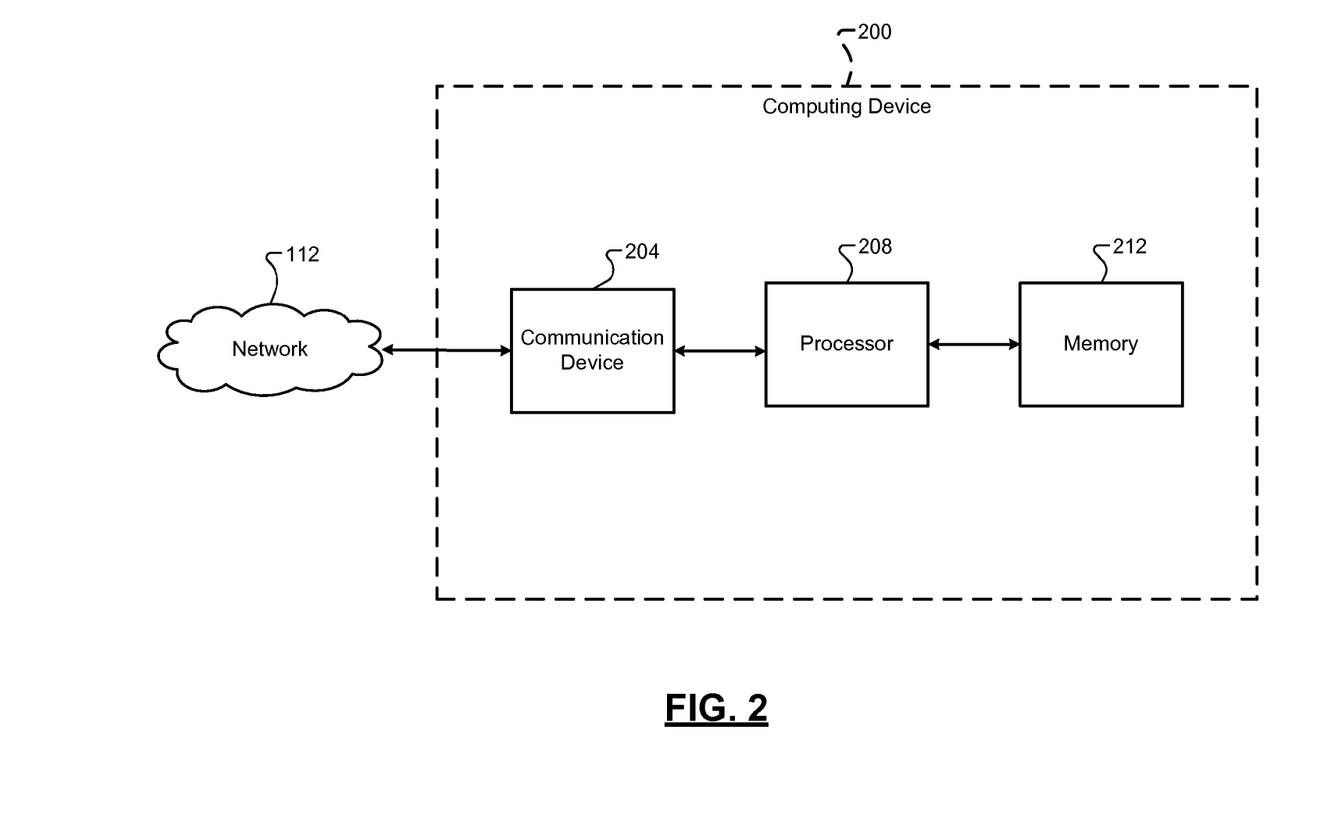
FIG. 2 is a functional block diagram of the example computing device of FIG. 1.

Referring now to FIG. 2, a functional block diagram of the example computing device 200 of FIG. 1 is illustrated. The computing device 200 can include a communication device 204, a processor 208, and a memory 212

The communication device 204 can control communication between the computing device 200 and other devices via the network 112. The communication device 204 can include any suitable components for communication via the network 112, e.g., a transceiver. In particular, the communication device 204 can control communication between the computing device 200 and the computing device 104 via the network 112. More specifically, the communication device 204 can receive text and output a most-likely parse of the text via the network 112.

The processor 208 can control operation of the computing device 200. It should be appreciated that the term "processor" as used herein can refer to either a single processor or two or more processors operating in a parallel or distributed architecture. For example, the processor 208 can perform functions including, but not limited to loading and executing an operating system of the computing device 200, controlling information input to and/or output from the computing device 200, controlling communication over the network 112 via the communication device 204, and/or controlling read/write operations at the memory 212. The memory 212 can be any suitable storage medium (flash, hard disk, etc.) configured to store information at the computing device 200. The processor 208 can also execute the techniques according to the present disclosure.

In various embodiments of the present disclosure, the computing device 200 is configured to perform dependency parsing of a text input. Dependency parsing generally refers to the technique of analyzing a text to determine it grammatical structure. Dependency parsing can be utilized in machine translation, as well as in other fields.

Figure 3:
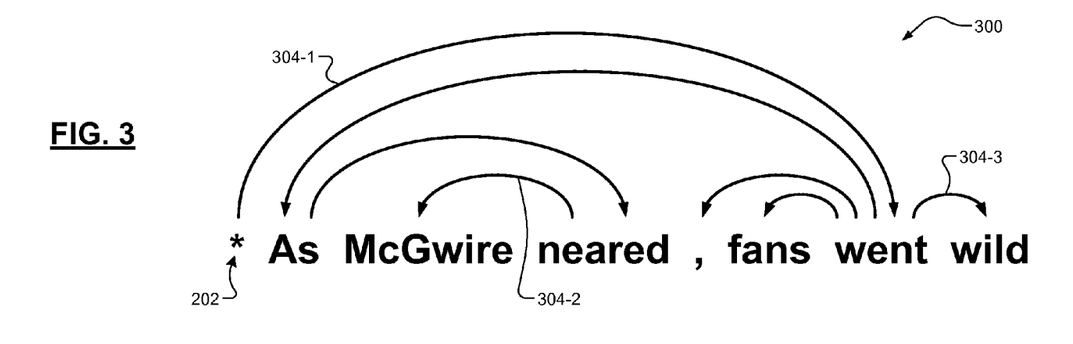
FIG. 3 is an illustration of an example text showing an appropriate parse according to some implementations of the present disclosure.

Referring now to FIG. 3, an example text 300 is shown. The example text 300 is a sentence that reads: "As McGwire neared, fans went wild." In addition to the text, a token 302 (represented by "*") indicating the beginning of the sentence is also shown. A plurality of arcs 304-1, 304-2 and 304-3 (collectively referred to as 304) representing head-modifier dependencies is also shown. In this example, the arcs 304 originate at a head word and point to a modifier of the head word. Thus, arc 304-3 indicates that the word "went" is a head and the word "wild" is a modifier of the head "went."

Figure 4:
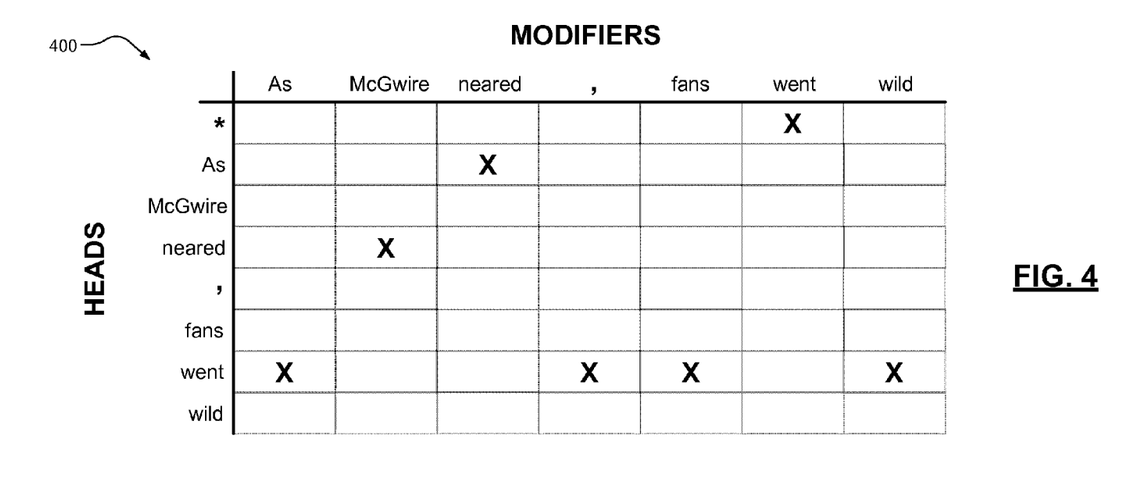
FIG. 4 is a diagram illustrating an index set for the example text of FIG. 3 according to some implementations of the present disclosure

A diagram illustrating an index set 400 for the text "As McGwire neared, fans went wild" is shown in FIG. 4. The index set can include some or all of the potential head-modifier dependencies for a given text. Each index of the index set is represented by a cell in the chart, and an "X" in a cell represents that the head-modifier dependency is an appropriate parse of the text. In some cases, it is more likely for an appropriate head-modifier dependency to exist between words that are within a relatively short distance from each other in a text, as opposed to words that are separated by a relatively long distance. Expressed in the terminology associated with FIG. 3, relatively short arcs 304 tend to be more likely to represent an appropriate head-modifier dependency than relatively long arcs 304.

Figure 5:
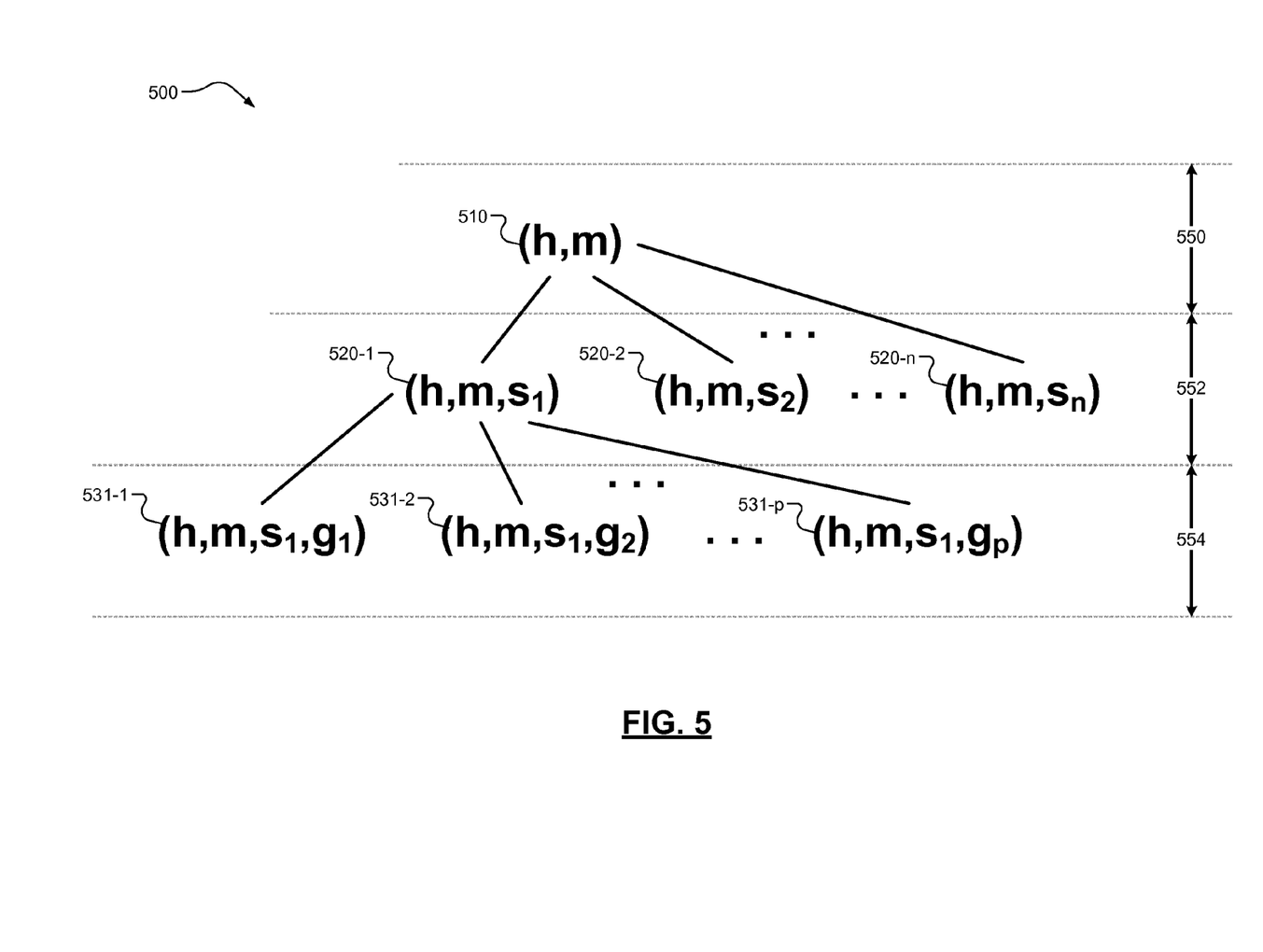
FIG. 5 is a diagram illustrating an index set for the example text of FIG. 3 represented in a tree structure according to some implementations of the present disclosure.

Referring now to FIG. 5, an index set 500 is shown represented in a tree structure. Each index of the index set can include one or more additional sub-indices. This is shown in the illustrated example in which index 510 is shown to include indices 520-1, 520-2 . . . 520-n. Furthermore, index 520-1 can include indices 531-1, 531-2 . . . 531-p. The index 510 can be referred to as a first-order index or an index at the first-order level 550. Indices at a first-order level 550 represent a dependency between a head word and its modifier. Indices 520-1, 520-2 . . . 520-n can be referred to as second-order indices or indices at the second-order level 552 and can represent, e.g., a dependency between a head word, its modifier and a sibling (a "sibling" can refer to a modifier that previously attached to the head word). Indices 531-1, 531-2 . . . 531-p can be referred to as a third-order indices or indices at the third-order level 554 and can represent, e.g., a dependency between a head word, its modifier, a sibling and a grandparent (a "grandparent" can refer to a head word above the current head word).

A dependency parser can be characterized by the level or order at which it parses a text. For example, a first-order parser will analyze and score indices at a first-order level 550. Similarly, a second-order parser will analyze and score indices at a second-order level 552, a third-order parser will analyze and score indices at a third-order level 554, etc. It should be appreciated that the accuracy of higher-order parsers may be greater than lower-order parsers, e.g., due to the larger amount of features and relationships captured by the model, but at the expense of a higher number of computations.

The present disclosure describes a structured prediction cascade that utilizes a plurality of pruning or filtering passes before determining a most-likely parse for a given text. In some embodiments, a coarse-to-fine inference model is utilized where one or more coarse parsers that are less accurate but quicker is utilized to filter out possible indices from an index set before a fine parser that is slower but more accurate is utilized to determine a most-likely parse from the filtered index set. A plurality of parsing algorithms may be utilized one after the other to prune the index set to a manageable size upon which the final parsing algorithm is utilized. In this manner, the total time required to determine a most-likely parse for a given text can be reduced when compared to a fine parser analyzing the entire index set, with little to no cost to accuracy.

In some embodiments, an index set of possible head-modifier dependencies for a piece of text is determined. Further, the index set can be characterized to include inner arcs and outer arcs. Inner arcs can be arcs 304 that represent possible head-modifier dependency between words separated by a distance less than or equal to a distance threshold. Conversely, outer arcs can be arcs 304 that represent possible head-modifier dependency between words separated by a distance greater than a distance threshold. It should be appreciated that, as mentioned above, an index set can include one or more additional sub-index sets (see FIG. 5). Thus, an arc 304 at a given order (first-order, second-order, third-order, etc.) can also include a number of additional arcs (sub-arcs) representing possible dependency between words in the text.

The index set may be pruned to reduce the number of indices that the parser will analyze. In various embodiments, the index set can be pruned to remove all arcs 304 greater than the longest head-modifier dependency distance observed in the training data utilized to train the parser model. For example only, if the longest head-modifier dependency distance observed in training data is fifteen, all arcs representing possible head-modifier dependency between words separated by a distance greater than fifteen can be eliminated from the index set.

Additionally or alternatively, an augmented vine parsing algorithm may be utilized to prune the index set. The augmented vine parsing algorithm can be used to analyze the inner arcs individually and the outer arcs as a group and thereby prune the indices for which it is determined are unlikely to provide the most-likely parse. Thus, in a first-order example where the index set includes (h, m) where h is a member of $\{0, \ldots n\}$, m is a member of $\{1, \ldots n\}$ and $h \neq m$ (n indicating the length of the text), any arc 304 for which $|h-m| \leq b$ where b indicates a distance threshold (an "inner arc") can be analyzed and scored by the parser. In this example, the parser can utilize any information available (e.g., the potential head word for a given modifier) to analyze and score each inner arc. The score determined by the parser can indicate the likelihood that the specific inner arc is appropriate. Similarly, for the outer arcs the parser can utilize any information available (e.g., the given modifier) to analyze and determine the likelihood that there exists a possible outer arc that is appropriate. In some embodiments, the likelihood that a specific inner arc is appropriate can be determined based on a max-marginal value of its corresponding specific index, although other algorithms may be utilized.

Each of the likelihood that the specific inner arc is appropriate and the likelihood that there exists a possible outer arc that is appropriate can be compared to a threshold. For each inner arc, when the likelihood that the specific inner arc is appropriate is greater than the threshold, the specific inner arc is not pruned from the index set. Additionally, when the likelihood that there exists a possible outer arc that is appropriate is greater than the threshold, none of the outer arcs are pruned from the index set. In this manner, after pruning with the augmented vine parsing algorithm, the index set will include: (i) inner arcs for which it has been determined have a likelihood greater than a threshold, and (ii) outer arcs for which is has been determined a likelihood that there exists a possible outer arc for a given modifier that is appropriate is greater than the threshold. The threshold may be determined based on machine learning from training data, as described more fully below.

In various embodiments, the threshold may be determined based on an analysis of training data. Support vector machines can be utilized for this analysis, although other machine learning techniques could alternatively be used. For example only, the threshold may be determined based on the equation:

$$t_\alpha(w) = \alpha \max_{y \in Y}(y \cdot w) + (1-\alpha)\frac{1}{|I|}\sum_{i \in I} m(i) \cdot w$$

where $t_\alpha(W)$ is the threshold, $\alpha$ is a model specific parameter having a value between 0 and 1 inclusive, y is a parse tree of a set of parse trees Y, w is a weight vector, i is an index of a set of indices I, and m(i) is a function of $\text{argmax}_{y \in Y: y(i)=1} y \cdot w$. The threshold can be a text-specific (e.g., sentence specific) value. The model specific parameter $\alpha$ can be set to balance the pruning of the index set; $\alpha=1$ will result in a pruning of all indices not in the best parse and $\alpha=0$ will result in a pruning of all indices with a max-marginal value below the mean.

After the index set has been pruned based on the augmented vine parsing algorithm, the index set may be further pruned by one or more additional pruning passes. For example only, a first-order parsing algorithm may be utilized to further prune the index set after the augmented vine parsing algorithm, a second-order parsing algorithm may be utilized to further prune the index set after the first-order parsing algorithm, and a third-order parsing algorithm may be utilized to further prune the index set after the second-order parsing algorithm. Each of these first-, second-, and third-order parsing algorithms can score each remaining index of the index set individually and compare the scores, which are indicative of the likelihood that a given index is an appropriate parse, to a threshold. Those indices for which the score is greater than or equal to the threshold may be maintained in the index set, while those indices for which the score is less than the threshold may be pruned from the index set. Each of the thresholds may be determined based on machine learning from training data.

After pruning the index set, a final parsing algorithm can be utilized to determine the most-likely parse from the remaining indices. Because a relatively large number of indices are likely to be removed during the pruning stages, the final parsing algorithm can utilize a more computationally-intensive, higher-order parsing algorithm while maintaining a reasonable operational time. The final parsing algorithm can utilize, e.g., a structured perceptron model, a max-margin model, a log-linear model, or a margin infused relaxed algorithm (with or without a hamming-loss margin).

Figure 6:
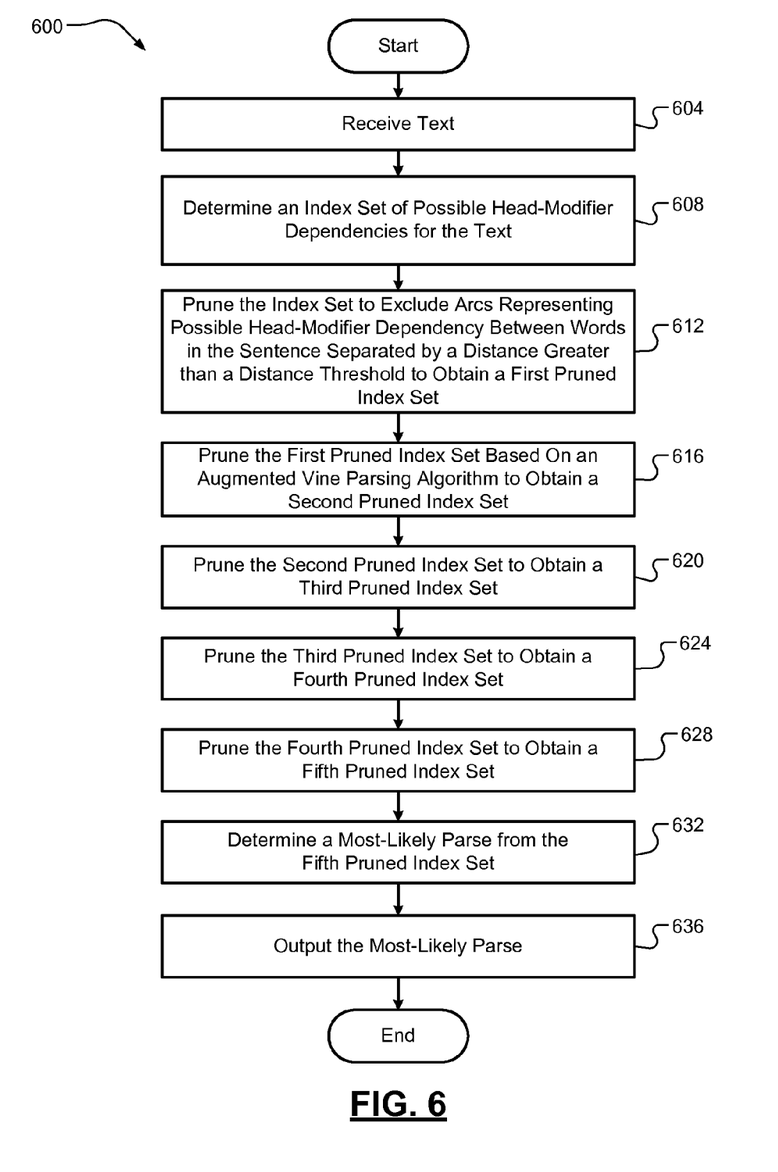
FIG. 6 is a flow diagram of an example technique for dependency parsing according to some implementations of the present disclosure.

Referring now to FIG. 6, a flowchart illustrating an example technique 600 of dependency parsing using structured prediction cascades is shown. At 604, text is received by the computing device 200. The text can be, for example, a sentence to be parsed. At 608, an index set of possible head-modifier dependencies for the text is determined. The index set can include inner arcs and outer arcs. The inners arcs can represent possible head-modifier dependency between words in the sentence separated by a distance less than or equal to a first distance threshold, and outer arcs can represent possible head-modifier dependency between words in the sentence separated by a distance greater than the first distance threshold. The index set can be pruned to exclude arcs representing possible head-modifier dependency between words in the sentence separated by a distance greater than a second distance threshold to obtain a first pruned index set at 612. In various embodiments, the second distance threshold can be based on a determination of a longest head-modifier dependency distance observed in training data.

At 616, the technique can further include pruning the first pruned index set based on an augmented vine parsing algorithm to obtain a second pruned index set. The second pruned index set can include: (i) each specific inner arc when a likelihood that the specific inner arc is appropriate is greater than a first threshold, and (ii) the outer arcs in the first pruned index set when a likelihood that there exists a possible outer arc that is appropriate is greater than the first threshold. In some embodiments, each specific inner arc can correspond to a specific index and the likelihood that the specific inner arc is appropriate can be determined based on a max-marginal value of its corresponding specific index.

At 620 the second pruned index set can be further pruned based on a second parsing algorithm to obtain a third pruned index set. The second parsing algorithm can be, for example, a first-order parsing model. The third pruned index set can be pruned based on a third parsing algorithm to obtain a fourth pruned index set at 624. The third parsing algorithm can be, for example, a second-order parsing model. Additionally, the fourth pruned index set can be pruned based on a fourth parsing algorithm, which can be a third-order parsing model, to obtain a fifth pruned index set at 628. A most-likely parse for the sentence can be determined from the fifth pruned index set at 632 and the computing device 200 can output the most-likely parse at 636.

Referring now to FIG. 6, a flowchart illustrating an example technique 600 of dependency parsing using structured prediction cascades is shown. At 604, text is received by the computing device 200. The text can be, for example, a sentence to be parsed. At 608, an index set of possible head-modifier dependencies for the text is determined. The index set can include inner arcs and outer arcs. The inners arcs can represent possible head-modifier dependency between words in the sentence separated by a distance less than or equal to a first distance threshold, and outer arcs can represent possible head-modifier dependency between words in the sentence separated by a distance greater than the first distance threshold. The index set can be pruned to exclude arcs representing possible head-modifier dependency between words in the sentence separated by a distance greater than a second distance threshold to obtain a first pruned index set at 612. In various embodiments, the second distance threshold can be based on a determination of a longest head-modifier dependency distance observed in training data.

At 616, the technique can further include pruning the first pruned index set based on an augmented vine parsing algorithm to obtain a second pruned index set. The second pruned index set can include: (i) each specific inner arc when a likelihood that the specific inner arc is appropriate is greater than a first threshold, and (ii) the outer arcs in the first pruned index set when a likelihood that there exists a possible outer arc that is appropriate is greater than the first threshold. In some embodiments, each specific inner arc can correspond to a specific index and the likelihood that the specific inner arc is appropriate can be determined based on a max-marginal value of its corresponding specific index.

At 620 the second pruned index set can be further pruned based on a second parsing algorithm to obtain a third pruned index set. The second parsing algorithm can be, for example, a first-order parsing model. The third pruned index set can be pruned based on a third parsing algorithm to obtain a fourth pruned index set at 624. The third parsing algorithm can be, for example, a second-order parsing model. Additionally, the fourth pruned index set can be pruned based on a fourth parsing algorithm, which can be a third-order parsing model, to obtain a fifth pruned index set at 628. A most-likely parse for the sentence can be determined from the fifth pruned index set at 632 and the computing device 200 can output the most-likely parse at 636.

Referring now to FIG. 6, a flowchart illustrating an example technique 600 of dependency parsing using structured prediction cascades is shown. At 604, text is received by the computing device 200. The text can be, for example, a sentence to be parsed. At 608, an index set of possible head-modifier dependencies for the text is determined. The index set can include inner arcs and outer arcs. The inners arcs can represent possible head-modifier dependency between words in the sentence separated by a distance less than or equal to a first distance threshold, and outer arcs can represent possible head-modifier dependency between words in the sentence separated by a distance greater than the first distance threshold. The index set can be pruned to exclude arcs representing possible head-modifier dependency between words in the sentence separated by a distance greater than a second distance threshold to obtain a first pruned index set at 612. In various embodiments, the second distance threshold can be based on a determination of a longest head-modifier dependency distance observed in training data.

At 616, the technique can further include pruning the first pruned index set based on an augmented vine parsing algorithm to obtain a second pruned index set. The second pruned index set can include: (i) each specific inner arc when a likelihood that the specific inner arc is appropriate is greater than a first threshold, and (ii) the outer arcs in the first pruned index set when a likelihood that there exists a possible outer arc that is appropriate is greater than the first threshold. In some embodiments, each specific inner arc can correspond to a specific index and the likelihood that the specific inner arc is appropriate can be determined based on a max-marginal value of its corresponding specific index.

At 620 the second pruned index set can be further pruned based on a second parsing algorithm to obtain a third pruned index set. The second parsing algorithm can be, for example, a first-order parsing model. The third pruned index set can be pruned based on a third parsing algorithm to obtain a fourth pruned index set at 624. The third parsing algorithm can be, for example, a second-order parsing model. Additionally, the fourth pruned index set can be pruned based on a fourth parsing algorithm, which can be a third-order parsing model, to obtain a fifth pruned index set at 628. A most-likely parse for the sentence can be determined from the fifth pruned index set at 632 and the computing device 200 can output the most-likely parse at 636.

Figure 7:
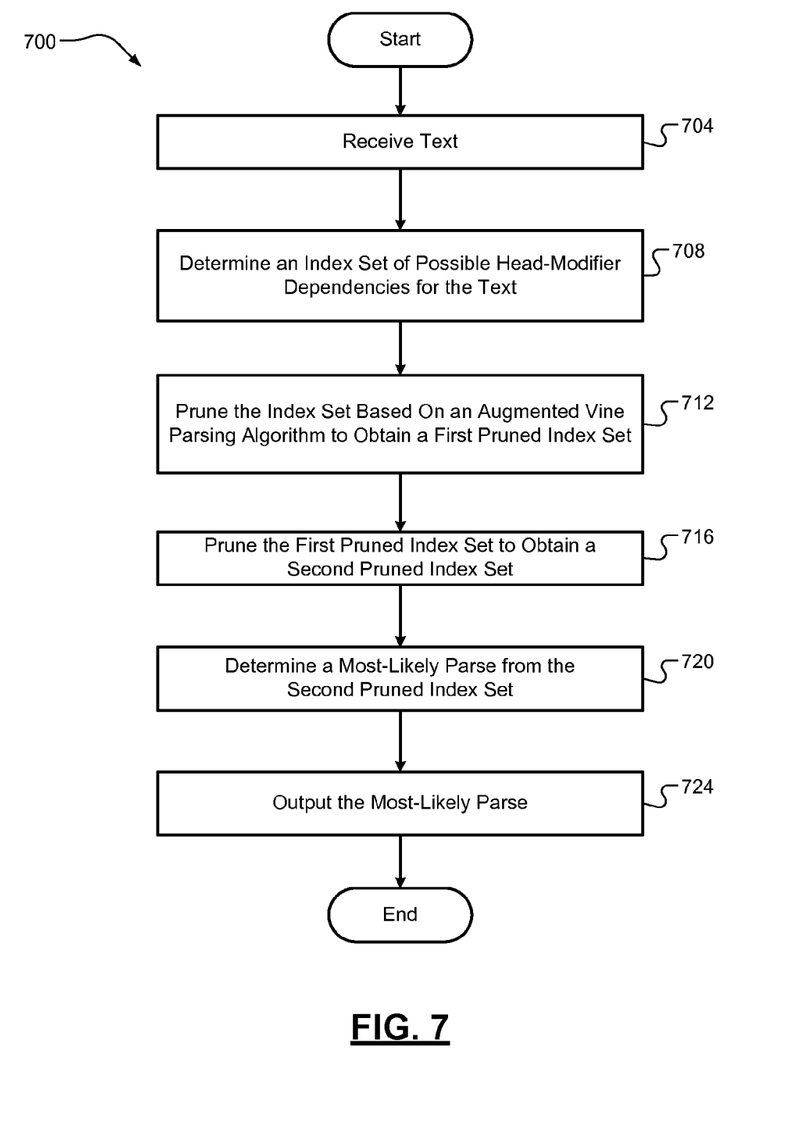
FIG. 7 is a flow diagram of an example technique for dependency parsing according to some implementations of the present disclosure.

Referring now to FIG. 7, a flowchart illustrating an example technique 700 of dependency parsing using structured prediction cascades is shown. At 704, text is received by the computing device 200. The text can be, for example, a sentence to be parsed. At 708, an index set of possible head-modifier dependencies for the text is determined. The index set can include inner arcs and outer arcs. The inners arcs can represent possible head-modifier dependency between words in the sentence separated by a distance less than or equal to a first distance threshold, and outer arcs can represent possible head-modifier dependency between words in the sentence separated by a distance greater than the first distance threshold.

At 712, the technique can further include pruning the index set based on an augmented vine parsing algorithm to obtain a first pruned index set. The first pruned index set can include: (i) each specific inner arc when a likelihood that the specific inner arc is appropriate is greater than a first threshold, and (ii) the outer arcs in the first pruned index set when a likelihood that there exists a possible outer arc that is appropriate is greater than the first threshold. At 716 the first pruned index set can be further pruned based on a second parsing algorithm to obtain a second pruned index set. A most-likely parse for the sentence can be determined from the second pruned index set at 720 and the computing device 200 can output the most-likely parse at 724.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs.

Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a computing device having one or more processors, a sentence including one or more words;
determining, at the computing device, an index set of possible head-modifier dependencies for the sentence, the index set including inner arcs and outer arcs, the inners arcs representing possible head-modifier dependency between words in the sentence separated by a distance less than or equal to a first distance threshold and outer arcs representing possible head-modifier dependency between words in the sentence separated by a distance greater than the first distance threshold;
pruning, at the computing device, the outer arcs to exclude arcs representing possible head-modifier dependency between words in the sentence separated by a distance greater than a second distance threshold to obtain a first pruned index set, the second distance threshold being based on a determination of a longest head-modifier dependency distance observed in training data;
pruning, at the computing device, the first pruned index set based on an augmented vine parsing algorithm to obtain a second pruned index set, the second pruned index set including: (i) each specific inner arc when a likelihood that the specific inner arc is appropriate is greater than a first threshold, and (ii) the outer arcs in the first pruned index set when a likelihood that there exists a possible outer arc that is appropriate is greater than the first threshold, wherein each specific inner arc corresponds to a specific index and wherein the likelihood that the specific inner arc is appropriate is determined based on a max-marginal value of its corresponding specific index;
pruning, at the computing device, the second pruned index set based on a second parsing algorithm to obtain a third pruned index set, the second parsing algorithm being a first-order parsing model;
pruning, at the computing device, the third pruned index set based on a third parsing algorithm to obtain a fourth pruned index set, the third parsing algorithm being a second-order parsing model;
pruning, at the computing device, the fourth pruned index set based on a fourth parsing algorithm to obtain a fifth pruned index set, the fourth parsing algorithm being a third-order parsing model;
determining, at the computing device, a most-likely parse for the sentence from the fifth pruned index set; and
outputting, from the computing device, the most-likely parse.

2. A computer-implemented method, comprising:
receiving, at a computing device, a sentence including one or more words;
determining, at the computing device, an index set of possible head-modifier dependencies for the sentence, the index set including inner arcs and outer arcs, the inners arcs representing possible head-modifier dependency between words in the sentence separated by a first distance less than or equal to a distance threshold and outer arcs representing possible head-modifier dependency between words in the sentence separated by a second distance greater than the distance threshold;
pruning, at the computing device, the index set based on an augmented vine parsing algorithm to obtain a first pruned index set, the first pruned index set including: (i) each specific inner arc when a likelihood that the specific inner arc is appropriate is greater than a first threshold, and (ii) the outer arcs when a likelihood that there exists any possible outer arc that is appropriate is greater than the first threshold;

pruning, at the computing device, the first pruned index set based on a second parsing algorithm to obtain a second pruned index set;

determining, at the computing device, a most-likely parse for the sentence from the second pruned index set; and outputting, from the computing device, the most-likely parse.

3. The method of claim 2, wherein each specific inner arc corresponds to a specific index, and wherein the likelihood that the specific inner arc is appropriate is determined based on a max-marginal value of its corresponding specific index.

4. The method of claim 2, further comprising pruning, at the computing device, the outer arcs to exclude arcs representing possible head-modifier dependency between words in the sentence separated by a distance greater than a second distance threshold before pruning the index set based on the augmented vine parsing algorithm.

5. The method of claim 4, wherein the second distance threshold is based on a determination of a longest head-modifier dependency distance observed in training data.

6. The method of claim 2, wherein the second parsing algorithm is a second-order parsing model.

7. The method of claim 2, wherein the first threshold is determined based on the equation:

$$t_\infty(w) = \infty \max_{y \in Y}(y \cdot w) + (1 - \alpha)\frac{1}{|I|}\sum_{i \in I} m(i) \cdot w$$

where $t_\infty(w)$ is the threshold, $\infty$ is a model specific parameter having a value between 0 and 1 inclusive, y is a parse tree of a set of parse trees Y, w is a weight vector, i is an index of a set of indices I, and m(i) is a function of $\text{argmax}_{y \in Y: y(i)=1} y \cdot w$.

8. The method of claim 2, wherein determining the most-likely parse for the sentence from the second pruned index set is based on a margin infused relaxed algorithm.

9. The method of claim 2, wherein the first threshold is determined based on analysis of training data utilizing support vector machines.

10. The method of claim 2, wherein:
each specific inner arc of the inner arcs corresponds to a specific index including a specific modifier word and a specific potential head word; and
the likelihood that the specific inner arc is appropriate is based on the specific modifier word and the specific potential head word.

11. The method of claim 2, wherein:
each specific outer arc of the outer arcs corresponds to a specific index including a specific modifier word and a specific potential head word; and
the likelihood that there exists any possible outer arc that is appropriate is based on the specific modifier word.

12. A computing device, comprising:
at least one processor; and
a non-transitory computer-readable storage medium storing executable computer program code, the at least one processor configured to execute the executable computer program code to perform operations including:
receiving a sentence including one or more words;
determining an index set of possible head-modifier dependencies for the sentence, the index set including inner arcs and outer arcs, the inners arcs representing possible head-modifier dependency between words in the sentence separated by a first distance less than or equal to a distance threshold and outer arcs representing possible head-modifier dependency between words in the sentence separated by a second distance greater than the distance threshold;

pruning the index set based on an augmented vine parsing algorithm to obtain a first pruned index set, the first pruned index set including: (i) each specific inner arc when a likelihood that the specific inner arc is appropriate is greater than a first threshold, and (ii) the outer arcs when a likelihood that there exists any possible outer arc that is appropriate is greater than the first threshold;

pruning the first pruned index set based on a second parsing algorithm to obtain a second pruned index set;

determining a most-likely parse for the sentence from the second pruned index set; and outputting the most-likely parse.

13. The computing device of claim 12, wherein each specific inner arc corresponds to a specific index, and wherein the likelihood that the specific inner arc is appropriate is determined based on a max-marginal value of its corresponding specific index.

14. The computing device of claim 12, wherein the operations further include pruning the outer arcs to exclude arcs representing possible head-modifier dependency between words in the sentence separated by a distance greater than a second distance threshold before pruning the index set based on the augmented vine parsing algorithm.

15. The computing device of claim 14, wherein the second distance threshold is based on a determination of a longest head-modifier dependency distance observed in training data.

16. The computing device of claim 12, wherein the second parsing algorithm is a second-order parsing model.

17. The computing device of claim 12, wherein the first threshold is determined based on the equation:

$$t_\infty(w) = \infty \max_{y \in Y}(y \cdot w) + (1 - \alpha)\frac{1}{|I|}\sum_{i \in I} m(i) \cdot w$$

where $t_\infty(w)$ is the threshold, $\infty$ is a model specific parameter having a value between 0 and 1 inclusive, y is a parse tree of a set of parse trees Y, w is a weight vector, i is an index of a set of indices I, and m(i) is a function of $\text{argmax}_{y \in Y: y(i)=1} y \cdot w$.

18. The computing device of claim 12, wherein determining the most-likely parse for the sentence from the second pruned index set is based on a margin infused relaxed algorithm.

19. The computing device of claim 12, wherein:
each specific inner arc of the inner arcs corresponds to a specific index including a specific modifier word and a specific potential head word; and
the likelihood that the specific inner arc is appropriate is based on the specific modifier word and the specific potential head word.

20. The computing device of claim 12, wherein:
each specific outer arc of the outer arcs corresponds to a specific index including a specific modifier word and a specific potential head word; and
the likelihood that there exists any possible outer arc that is appropriate is based on the specific modifier word.

* * * * *